United States Patent [19]

Hartov

[11] Patent Number: 5,963,002
[45] Date of Patent: Oct. 5, 1999

[54] WIRELESS ELECTRICAL CONNECTION TO MOBILE ROBOTS OR VEHICLES

[76] Inventor: Alexander Hartov, 53 School St., Lebanon, N.H. 03766

[21] Appl. No.: 08/867,225

[22] Filed: Jun. 2, 1997

[51] Int. Cl.⁶ ....................................................... B25J 5/00
[52] U.S. Cl. ...................................... 318/568.12; 318/587
[58] Field of Search .............................. 318/687, 568.12, 318/587; 361/220; 901/1, 50

[56] References Cited

U.S. PATENT DOCUMENTS

| | | | |
|---|---|---|---|
| 4,535,278 | 8/1985 | Asakawa | 318/687 |
| 4,823,062 | 5/1989 | Hofman et al. | 318/687 |
| 5,126,648 | 6/1992 | Jacobs | 318/640 |
| 5,777,402 | 7/1998 | Chitayat | 310/12 |

Primary Examiner—William M. Shoop, Jr.
Assistant Examiner—Rita Leykin

[57] ABSTRACT

A robot has a surface over which the robot moves, the surface being tiled with electrodes and having a power supply connected to the electrodes so that the electrodes form an alternating pattern of positive and negative electrodes, the robot having a plurality of contacts resting on the surface, each of the contacts being connected to oppositely biased diodes, the robot having a motor connected between leads connecting all the diodes of each bias, the contacts being positioned so that at least two of said contacts always rest on a negative and a positive electrode to power the motor.

A control signal generator connected to the electrodes may send a control signal to a control signal receiver through the power circuitry to control the motor of the moving robot. In a like manner, a data signal generator on the robot may send data signals to a data signal receiver connected to the electrodes of the surface.

8 Claims, 5 Drawing Sheets

WIRELESS ELECTRICAL CONNECTION TO MOBILE ROBOTS OR VEHICLES

FIELD OF THE INVENTION

This invention relates to apparatus for providing electrical power to a mobile device such as a robot, toy or vehicle while sending control and data signals to and from the vehicle.

BACKGROUND OF THE INVENTION

Mobile devices, which will hereafter be called robots, need some form of energy source for propulsion, movement, and other functions. This has been accomplished by several means in the past. The most common way is to have a storage system, such as a battery, which stores electrical energy. Another common method is to have wires attached to the robot providing the energy supply.

Along with the problem of providing power to the robot, there is the need to transmit control signals. It may also be desirable to receive data signals from the robot. Radio broadcasting has been used for signal transmission, as have infrared links. Each of these methods has some drawback. Batteries as a power source are usually heavy, adding considerably to the overall size of the robot. Tethered robots are limited in their range, broadcasting entails extensive specialized circuitry, while infrared links require a direct line of sight transmission path.

OBJECTS OF THE INVENTION

A main object of this invention is to provide power to a mobile robot for the purpose of self-propulsion and other activities.

Another object of this invention is to provide data transfer to a mobile robot for the purpose of controlling its activity.

A further object of this invention to provide a data transfer from a mobile robot for the purpose of receiving data from it, such as the robot may generate in its activities.

SUMMARY OF THE INVENTION

The invention provides apparatus for making electrical contact with a mobile robot, the apparatus including a surface tiled with a pattern of positive and negative electrodes on which a robot moves, contacts on the robot drawing power from the electrodes, signal generating means connected to the electrodes passing control signals to the robot, and means associated with the electrodes receiving data signals from the robot.

The robot, free to move on the surface, may depend on the force of its own weight to hold its contacts against the surface.

The surface will be tiled with two polarities of electrodes in such a way that a large proportion of its area will be electrically active, divided roughly evenly between the two polarities and with a small fraction of the area between the electrodes being occupied by insulating material.

DETAILED DESCRIPTION OF THE INVENTION

Figure 1:
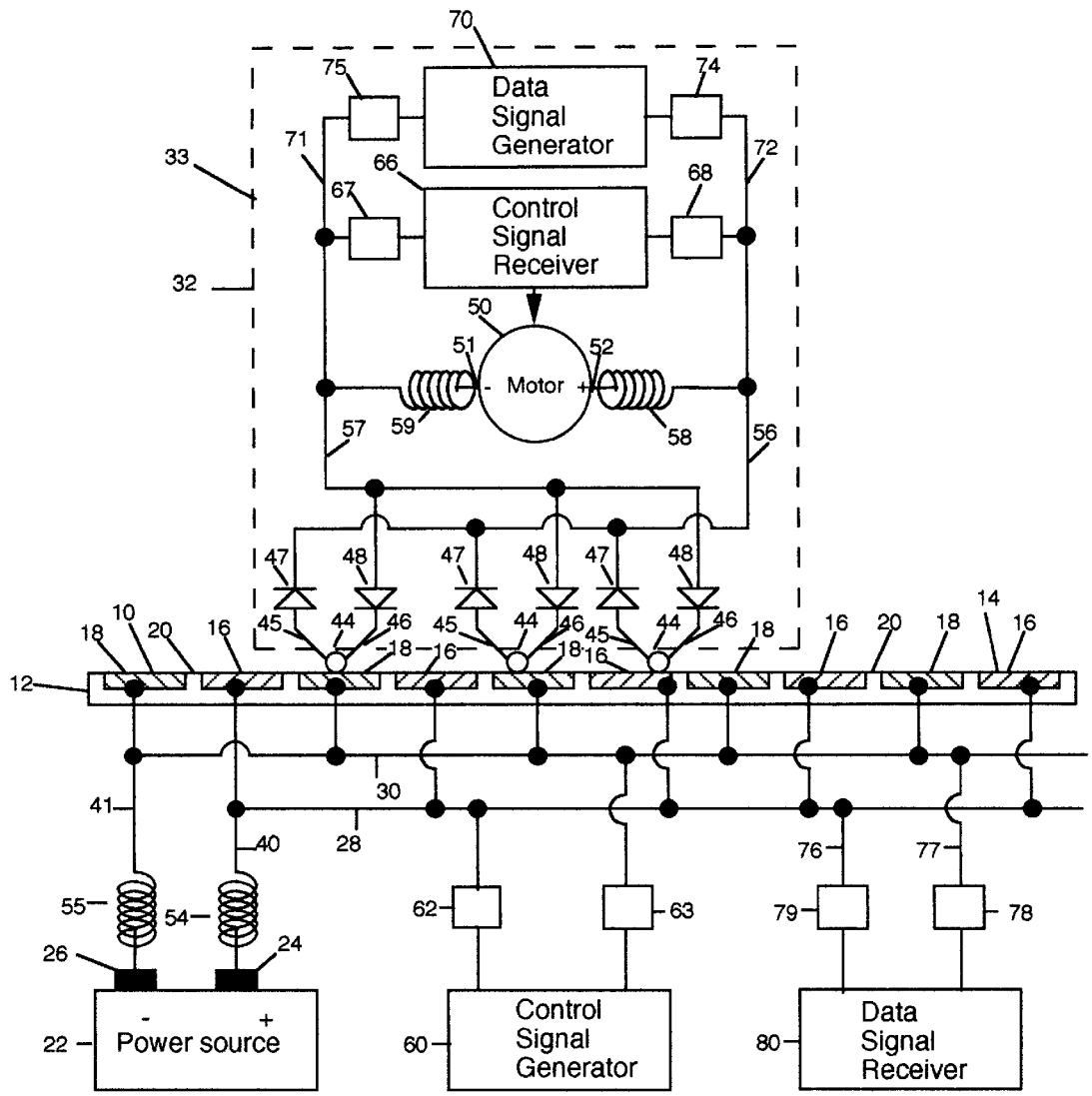
FIG. 1 is a vertical section through a fragment of a surface containing electrodes with a robot structure generally designated by dotted lines in contact with the surface and showing associated circuitry of the robot and the surface.
Figure 2:
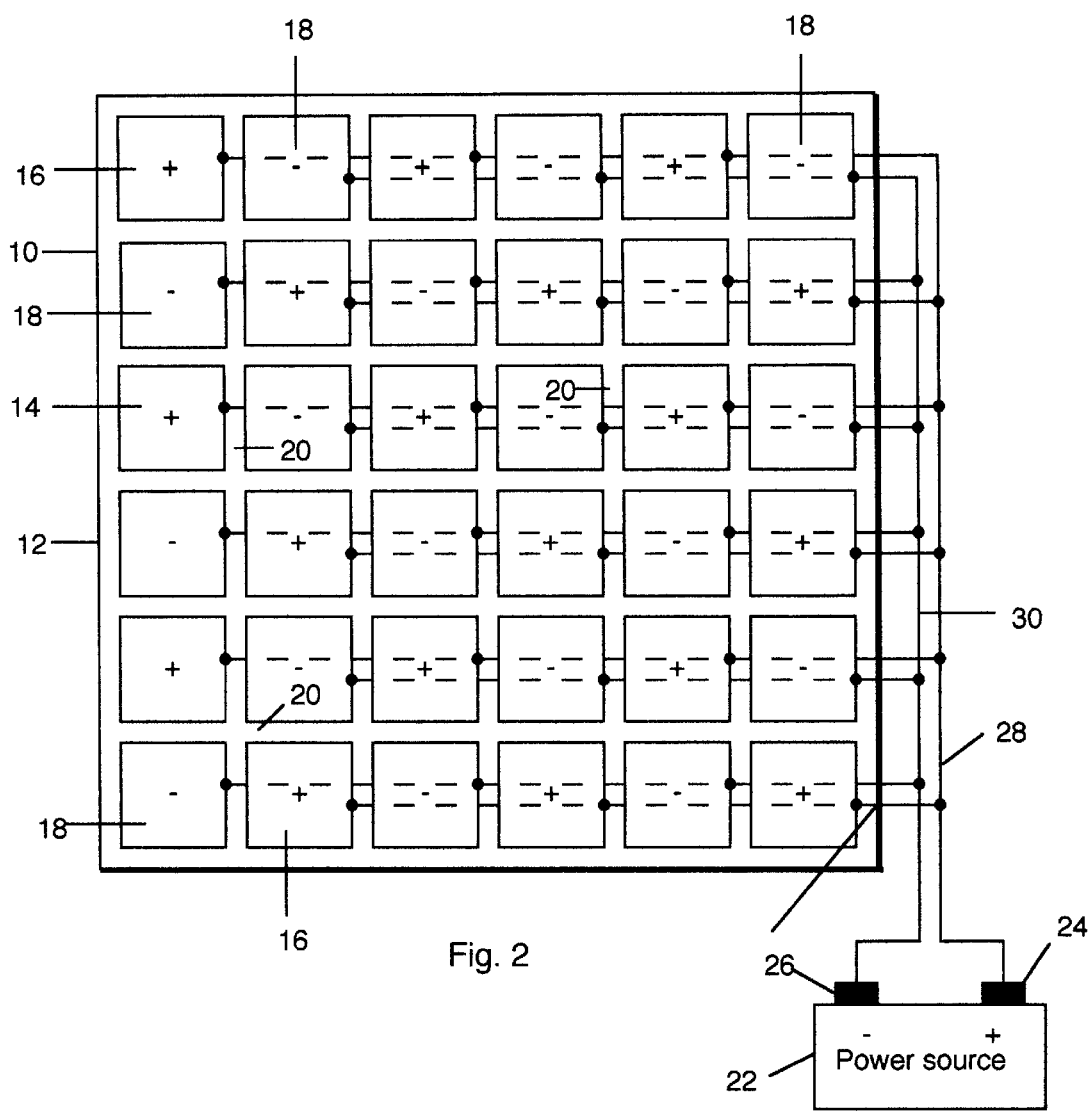
FIG. 2 is a top view of an electrode containing surface with a power source connected thereto.
Figure 3:
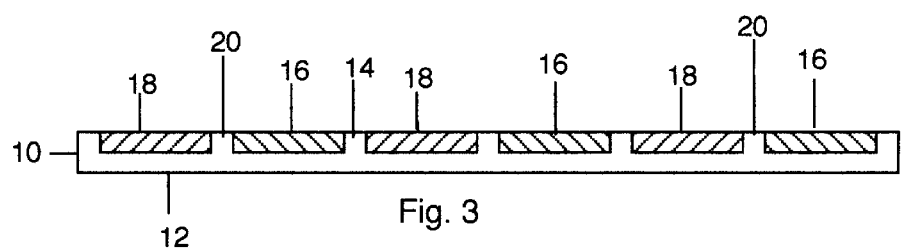
FIG. 3 is a transverse vertical section through the surface of FIG. 2.

Referring to FIGS. 1, 2 and 3, a board 10 of an insulating material 12 has an upper surface 14 in which are embedded or on which are otherwise formed electrodes 16 and 18. In the first embodiment of this invention, the electrodes 16 and 18 are square with insulating material 12 surrounding them to form narrow boundaries 20.

As may be seen in FIGS. 1 and 2, a power source 22 has positive and negative terminals 24 and 26. Positive terminal 24 is connected by lead 28 to the positive electrodes 16. Negative terminal 26 is connected by negative lead 30 to the negative electrodes 18. Positive electrodes 16 and negative electrodes 18 form a checkerboard pattern tiling the surface 14 of board 10.

As is further shown in FIG. 1, a robot is generally designated by the reference numeral 33 and blocked out in dotted lines 32. Robot 33 is moved on surface 14 by robot powering means such as motor 50 and drive means such as wheels or walking feet (not shown). Robot 33 mounts a plurality of spaced apart contacts 44 which rest on or are held against surface 14.

Figure 1A:
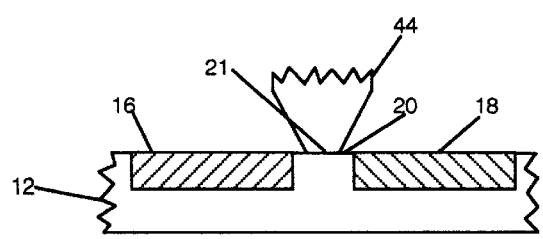
FIG. 1A is a vertical section through a fragment of a surface containing electrodes with a broken away tip of a contact resting thereon.

As shown in FIG. 1A, the contacts 44 should have a smaller contact area 21 than the width of the boundaries 20 so a contact 44 moving across a boundary 20 will not connect and short adjacent electrodes 16 and 18. Referring again to FIG. 1, leads 45 and 46 connect each contact 44 to a pair of diodes 47 and 48. Diodes 47 pass positive current from a contact 44 and diodes 48 block the flow of positive current from a contact 44. Therefore, when a contact 44 is on an electrode 16, current will flow through a diode 47 to the positive terminal 52 of a motor 50 or other robot powering means (not shown). Current from the negative terminal 51 of motor 50 will pass through a diode 48 to a contact 44 on an electrode 18. Thus it may be seen that any contact 44 can supply either positive or negative current depending whether it is on an electrode 16 or an electrode 18.

As shown in FIG. 1, a high frequency filters 54 and 55 are connected, respectively, between terminal 24 and lead 28 and between terminal 26 and lead 30 by the conductors 40 and 41. High frequency filters 58 and 59 are connected, respectively, between the motor terminal 52 and lead 56 and between motor terminal 51 and lead 57. Lead 56 is connected to all the diodes 47 and lead 57 to all the diodes 48. The high frequency filters 54, 55, 58 and 59 isolate power source 22 and motor 50 from high frequencies.

A control signal generator 60 transmits a high frequency control signal to lead 28 through low frequency blocking filter 62. The control signal will travel to the control signal receiver 66 on the robot through an electrode 16, a contact 44, a diode 47, lead 56, and low frequency blocking filter 68. The signal will return from signal receiver 66 through a low frequency blocking filter 67, lead 57, a diode 48, a contact 44, an electrode 18, lead 30, and low frequency blocking filter 63. Thus control signals are transmitted from signal generator 60 to signal receiver 66 as high frequency signals riding on the power supply voltage. Signal receiver 66 incorporates well known control circuitry (not shown) to start, stop, and otherwise control motor 50 and any other powered devices (not shown) incorporated in robot 33. In this manner robot 33 is remotely operated.

A data signal generator 70 on robot 33 receives information from elements (not shown) of robot 33. Data signal generator 70 could sense position, contact, temperature, speed, and other measurements of elements (not shown) of robot 33 and convert these measurements into data signals using well known techniques. By means of leads 71 and 72 connected to the low frequency blocking filters 74 and 75 signals generated by data signal generator 70 are sent to leads 56 and 57 to contacts 44 and electrodes 16 and 18 to data signal receiver 80 through leads 76 and 77 and the low frequency blocking filters 78 and 79.

A human or electronic operator (not shown) controlling robot 33 can activate signal generator 60 and integrate data signals from signal receiver 80. Since robot 33 can be a toy, visual observation can be used to monitor robot 33 in place of data signal generator 70 and data signal receiver 80.

Figure 4:
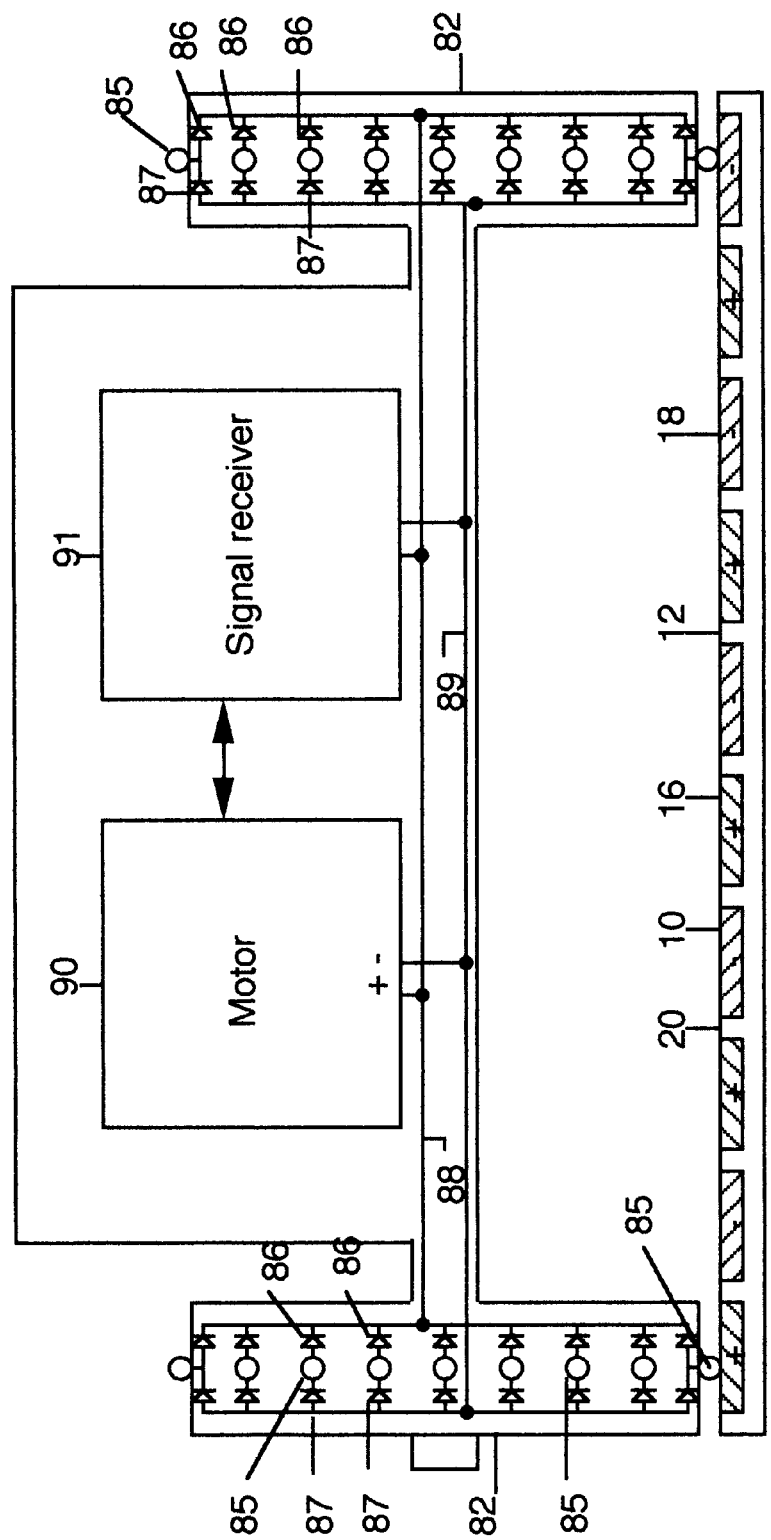
FIG. 4 is a vertical section through a fragment of a surface showing circuitry of a wheeled robot thereon.
Figure 5:
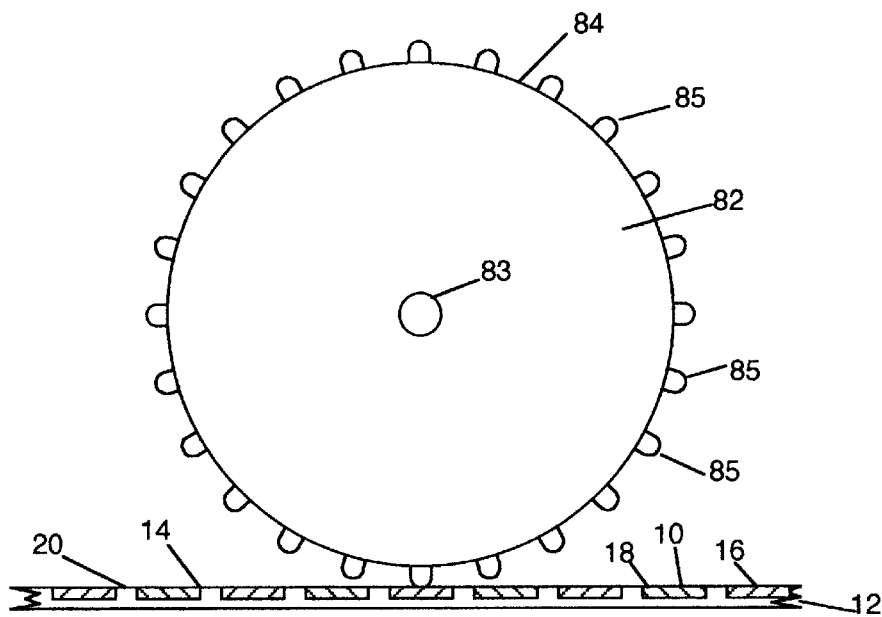
FIG. 5 is a vertical section of a fragment of a surface with a contact studded wheel of a wheeled robot thereon.

Referring now to FIGS. 4 and 5, a robot (not shown) may have a plurality of wheels 82 rotating on or with axles 83. The rim 84 of wheel 82 has contacts 85 mounted thereon to contact a board 10 as shown in FIG. 1. Board 10 has electrodes 16 and 18 mounted in or on an insulating material 12. As may be seen in FIG. 4, each contact 85 of wheel 82 is connected to two diodes 86 and 87, diodes 86 passing positive current flow away from the contact 85 and diode 87 blocking positive current flow away from contact 85. A positive lead 88 is connected to all the diodes 86 and a negative lead 89 is connected to all diodes 87. In the same manner as has been described for FIG. 1, a power source (not shown in FIG. 4) may transmit power to a motor 90 or other device. Also, a signal receiver 91 may receive signals to control motor 90. The number of wheels 82 and the spacing of their contacts 85 should be chosen to maintain substantially constant contact with a given board 10.

Figure 7:
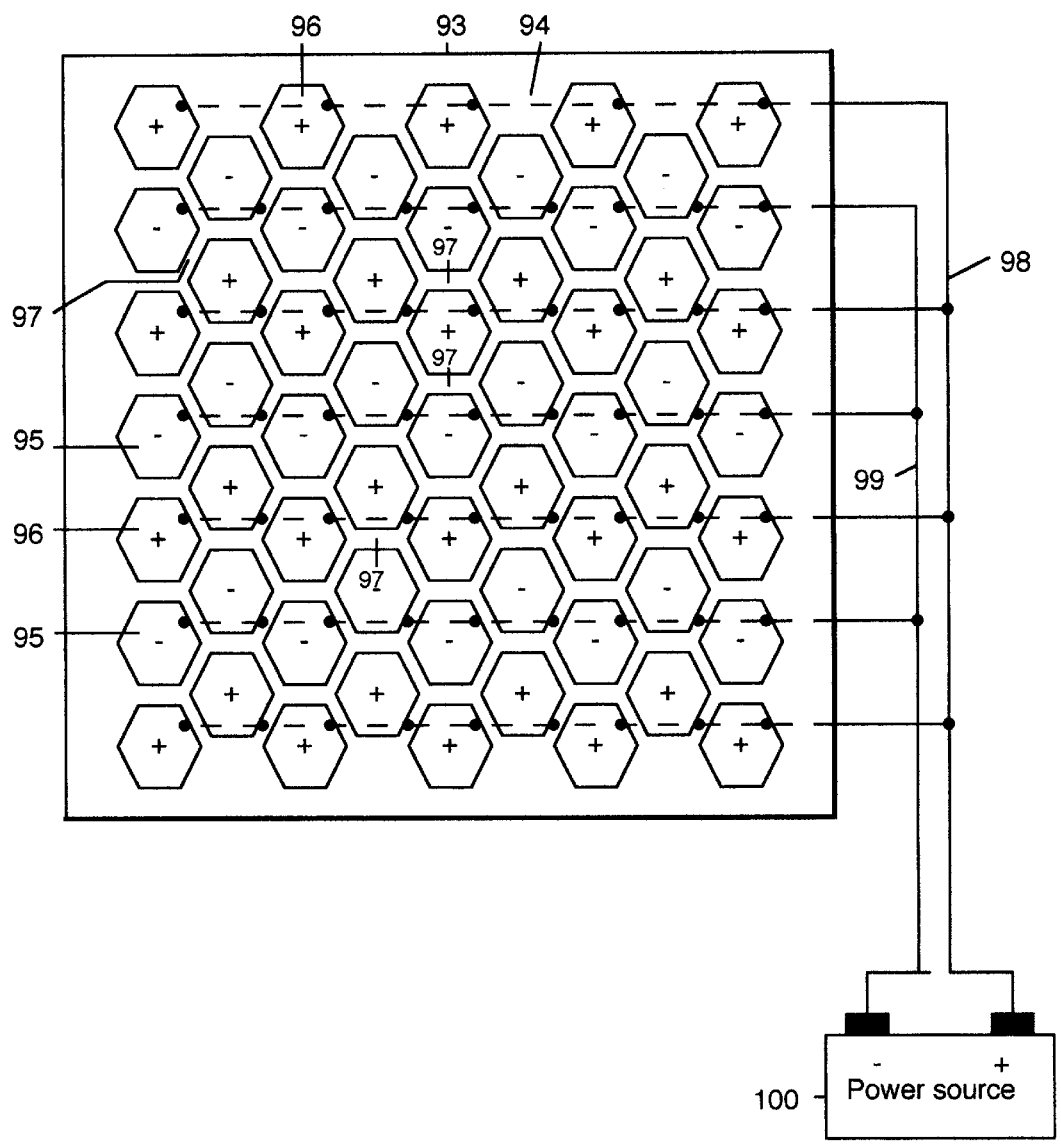
FIG. 7 is a top view of a surface tiled with hexagonal electrodes.

As shown in FIG. 7, a board 93 of insulating material 94 is tiled with hexagonal electrodes 95 and 96 with borders 97 therebetween. Leads 98 and 99 connect the electrodes 96 and 97 to power source 100. A board 93 may be tiled with electrodes 95 and 96 of any shape and in any alternating pattern that will largely cover it.

Figure 6:
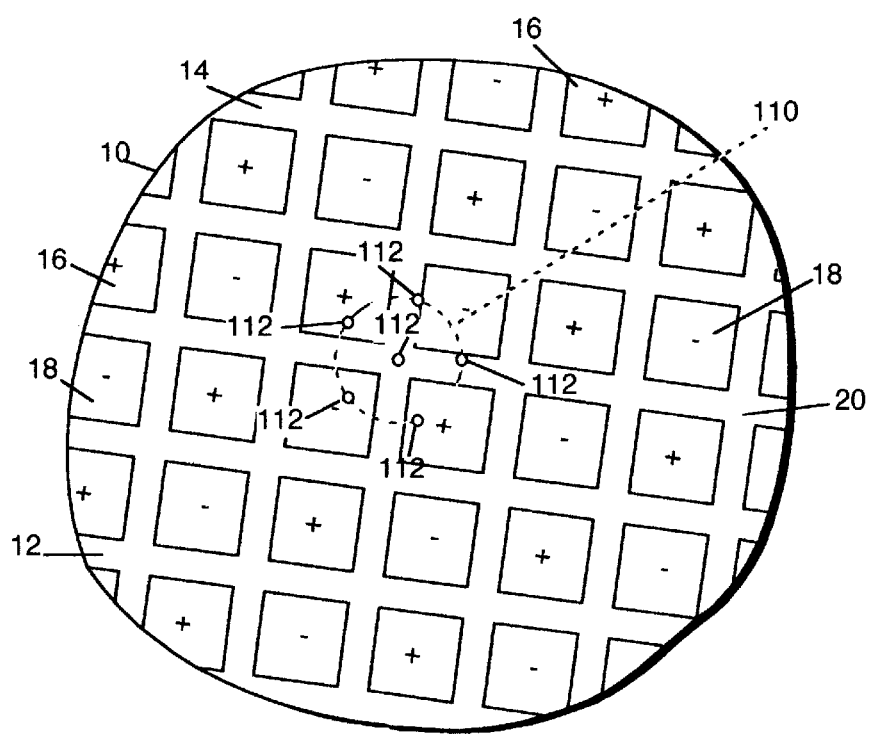
FIG. 6 is a top view of a surface tiled in a checkerboard pattern of tiles with contacts thereon in a contact mounting pattern outlined in dotted lines.

Referring now to FIG. 6, a board 10 has square positive and negative electrodes 16 and 18 in a checkerboard pattern mounted on an insulating material 12 leaving narrow boundaries 20. A walking robot (not shown) may have a foot delineated by the dotted circle 110. The circle 110 has a diameter equal to one and one half the times the length of the sides of the electrodes 16 and 18 with their boundaries 20. Five contacts 112 are disposed equidistant from each other on the circle 110 with a sixth contact 112 at the center of the circle 110. On a checkerboard pattern of electrodes 16 and 18, this arrangement of contacts 112 will guarantee that at least two contacts 112 are touching electrodes 16 and 18 of opposite polarity.

If an arrangement of contacts 112, as shown in FIG. 7, is provided on a robot (not shown), gravity will hold the contacts 112 against a surface 20 if the contacts 112 form at least a part of the robot's support. However, if the robot moves on supports of insulating material (not shown) such as plain rubber wheels (not shown), the contacts 112 can be forced by a spring or other resilient means (not shown) against a surface 20. With such resilient means, surface 20 may be disposed above a robot 33 and have the contacts 112 forced upward against it.

What is claimed is:

1. A robot and a surface along which said robot moves, comprising, in combination, a non-conductive surface, electrodes tiled contiguously on said surface, said electrodes being spaced apart to form non-conductive borders between said electrodes, a power source with positive and negative terminals, said positive and negative terminals being alternately connected to said electrodes of said surface so that said electrodes form alternating interspaced positive and negative electrodes, and a robot, said robot having a plurality of contacts against said surface, each of said contacts forming a contact area with said surface, said contact area being smaller than said nonconductive borders between said electrodes, a diode passing a positive current connected to each of said contacts and a diode passing a negative current connected to each of said contacts, robot powering means on said robot having two terminals, said diodes passing a positive current being connected to one of said terminals of said robot powering means and said diodes passing a negative current being connected to the other of said terminals of said robot powering means, said plurality of contacts contacting said electrodes so that at least one positive electrode and at least one negative electrode is contacted by said contacts to activate said robot powering means.

2. The combination according to claim 1 wherein said surface is horizontal and said robot rests on said surface supported by at least two of of said plurality of contacts.

3. The combination according to claim 1 with the addition of first and second high frequency filters connected to said terminals of said power source, a first positive lead connected between said first high frequency filter and said positive electrodes, a second negative lead connected between said second high frequency filter and said negative electrodes, a control signal generator associated with said surface connected to said first positive lead and said second negative lead, a control signal receiver on said robot, third and fourth high frequency filters connected to said terminals of said robot powering means, a third positive lead of said robot connecting said diodes passing a positive current to said third high frequency filter, a fourth negative lead of said robot connecting said diodes passing a negative current to said fourth high frequency filter, a fifth positive lead of said robot connected between said third high frequency filter and said third positive lead, and a sixth negative lead of said robot connected between said fourth high frequency filter and said fourth negative lead, said control signal receiver controlling said robot activating means.

4. The combination according to claim 3 with the addition of a data signal generator on said robot, a seventh positive lead of said robot connected between said data signal generator and said third positive lead of said robot, an eighth negative lead of said robot connected between said data signal generator and said fourth negative lead, and a data signal receiver associated with said surface connected to said first and second positive and negative leads.

5. The combination according to claim 4 wherein said control signal generator and said data signal generator generate high frequency signals riding on the power source voltage, and with the addition of low frequency blocking filters isolating said control and data signal generators and said control and data signal receivers from said power source and said robot powering means.

6. The combination according to claim 5 wherein said electrodes are square and tiled to form a checkerboard pattern of said positive and negative electrodes, and wherein at least two of said plurality of contacts are disposed in a pattern, said pattern of contacts having five of said contacts located equidistantly apart on a circle having a diameter equal to one and one half times the sides of said square electrodes and said pattern of said contacts having a sixth of said contacts at the center of said circle.

7. A robot and a horizontal board on which said robot moves, comprising, in combination, a board, a non-conductive upper surface of said board, negative and positive electrodes tiled on said upper surface, said electrodes being spaced apart to form non-conductive borders of said upper surface between said electrodes, a power source having positive and negative terminals, a first positive lead connecting said positive terminals to said positive electrodes, a second negative lead connecting said negative terminal to said negative electrodes so that electrodes form a pattern of positive and negative electrodes, a first pair of high frequency filters connected by said first leads between said electrodes and said terminals of said power source, a control signal generator, a first pair of high frequency filters connected between said control signal generator and said first positive and negative leads, a data signal receiver, and a second pair of low frequency filters connected between said data signal receiver and said first positive and negative leads; and said robot having a plurality of contacts, at least two of said plurality of contacts supporting said robot on said surface and being in contact with said surface, each of said contacts having a contact area with said surface smaller than said non-conductive borders, a diode passing a positive current connected to each of said contacts and a diode passing a negative current connected to each of said diodes, robot powering means having positive and negative terminals, a second pair of high frequency filters connected to said terminals of said robot powering means, second positive and negative leads connected, respectively, between said diodes passing a positive current and one of said second pair of high frequency filters and between said diodes passing a negative current and the other of said second pair of high frequency filters, a control signal receiver connected between said second positive and negative leads, and a data signal generator connected between said second positive and negative leads, said control signal receiver controlling said robot powering means.

8. The combination according to claim 7 wherein said electrodes are square and tiled to form a checkerboard pattern of said positive and negative electrodes, and wherein at least two of said plurality of contacts are disposed in a pattern, said pattern of contacts having five of said contacts located equidistantly apart on a circle having a diameter equal to one and one half times the sides of said square electrodes and said pattern of said contacts having a sixth of said contacts at the center of said circle.

\* \* \* \* \*